Oct. 9, 1951     E. M. JUERGENSON     2,570,559

WHEEL ADAPTER PLATE

Filed Dec. 29, 1945

INVENTOR.

E. M. Juergenson

BY

ATTYS

Patented Oct. 9, 1951

2,570,559

UNITED STATES PATENT OFFICE 2,570,559

WHEEL ADAPTER PLATE

Elwood M. Juergenson, Linden, Calif.

Application December 29, 1945, Serial No. 637,911

1 Claim. (Cl. 301—9)

This invention relates in general to the mounting of tire wheels on vehicles.

In particular the invention is directed to, and it is an object to provide, a novel wheel adapter plate designed so that a tire wheel having a given bolt hole circle can be effectively mounted on a vehicle hub wherein the wheel securing studs are on a circle having a different diameter.

A further object of this invention is to provide a wheel adapter plate, as in the preceding paragraph, which is useful to mount the spare tire wheel of an automobile on a hub of a trailer, wherein said hub has wheel securing studs on a circle different than the bolt hole circle of said spare tire wheel. In this manner the spare tire wheel of the automobile is usable both thereon and on the trailer, and it is not necessary to carry a separate spare tire wheel for the trailer.

An additional object of the invention is to provide a wheel adapter plate which comprises a heavy-duty circular plate having a circumferential row of bolt holes on a circle of one radius, and a row of axially projecting studs on a circle of another radius; said studs including means to space a wheel mounted thereon from the studs, of a hub, which extend through the circle of bolt holes in the plate.

A further object of the invention is to produce a simple and inexpensive device, and yet one which will be exceedingly effective for the purpose for which it is designed.

These objects are accomplished by means of such structure and relative arrangement of parts as will fully appear by a perusal of the following specification and claim.

In the drawings similar characters of reference indicate corresponding parts in the several views.

Figure 1:
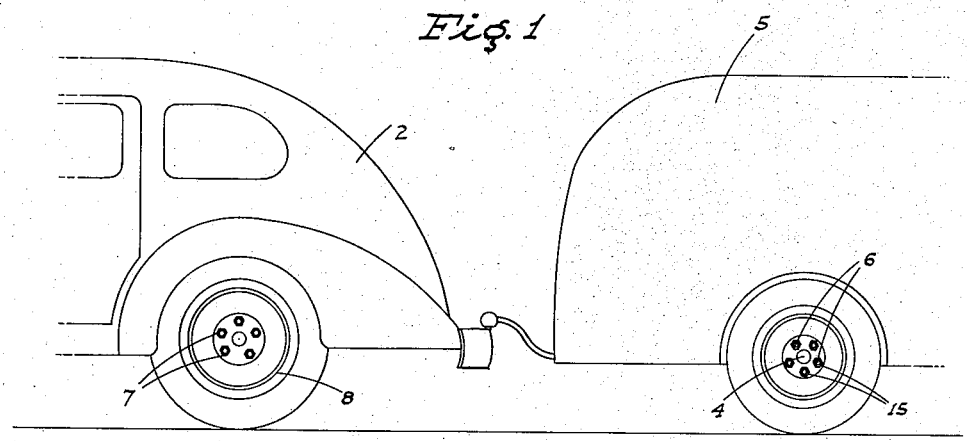
Figure 1 is a side elevation of an automobile-trailer combination illustrating wheels thereon having different bolt hole circles; a situation wherein my invention is useful.
Figure 2:
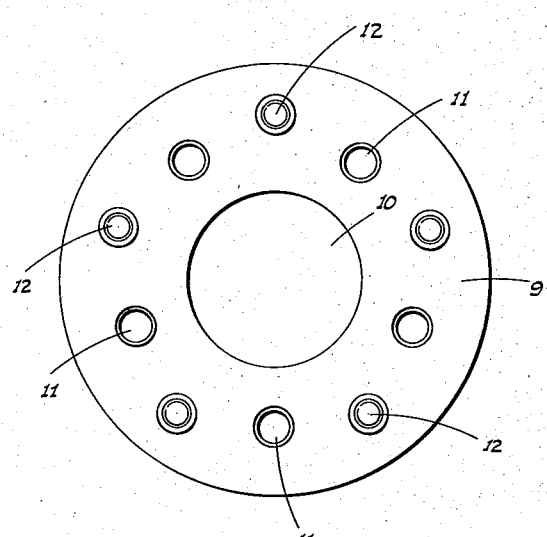
Figure 2 is a face view of the wheel adapter plate.
Figure 3:
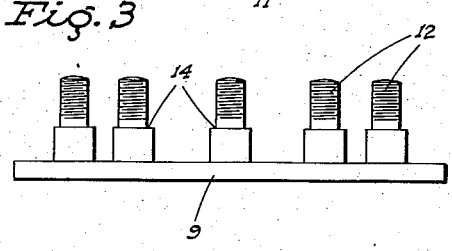
Figure 3 is a plan view of said plate as disclosed vertically for use.
Figure 4:
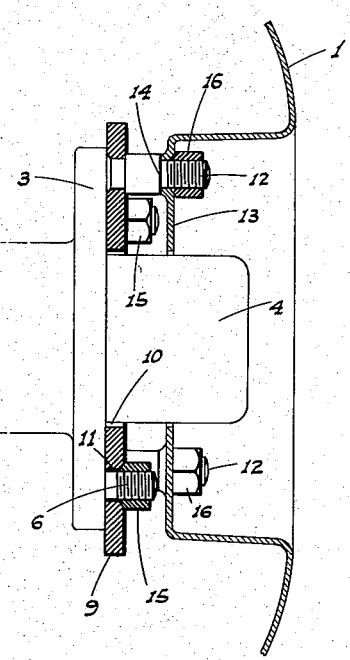
Figure 4 is a sectional elevation of the device in use.

Referring now more particularly to the characters of reference on the drawings, the invention is primarily adapted for use to effectively mount, in a practical manner, the spare tire wheel 1 of an automobile 2 on the attachment flange 3 of a hub 4 on a trailer 5, when the studs 6 of said attachment flange 3 are on a circle different than the circle of the studs 7 employed to secure the wheels 8 of the automobile 2 on the latter. While, as above indicated, the invention is especially useful in an automobile-trailer combination, such invention may obviously be put to other uses wherein it is desired to mount a wheel having bolt holes on one circle in connection with a hub flange having projecting studs on another circle.

The wheel adapter plate, which comprises the present invention, is a heavy-duty circular metallic plate 9, formed with a central opening 10 for projection of the hub 4 therethrough.

The circular adapter plate 9 is formed with a circumferential row of equally spaced bolt holes 11 on a circle such that said holes 11 are adapted to register with the studs 6 on attachment flange 3 included in a hub of a trailer or the like.

A circumferential row of evenly spaced studs 12 is mounted on the plate 9 with the studs projecting axially therefrom; the circle of the studs 12 being different than the circle of the bolt holes 11; i. e. the circle of the studs 12 corresponds to the circle of the bolt holes in the attachment flange 13 of the spare tire wheel 1. The studs are elongated and are enlarged, at their inner end portion, to provide outwardly facing stop shoulders 14 on each thereof some distance outwardly of the adjacent face of the plate 9, for the purpose hereinafter described.

To use the above described wheel adapter plate for mounting of the spare tire wheel 1 of an automobile 2 in connection with a trailer 5 wherein there is a differential between the circle of the studs on the attachment flange 3 and the circle of the bolt holes in the attachment flange 13 of the wheel 1, the invention is applied as follows:

The circular adapter plate 9 is first mounted on the attachment flange 3 of the hub 4 by projecting the studs 6 through the circumferential row of bolt holes 11; retaining nuts 15 being threaded on said studs for this purpose.

Thereafter the attachment flange 13 of the spare tire wheel 1 of the automobile is mounted on the row of projecting studs 12, with said flange abutting against the stop shoulders 14. Retaining nuts 16 are threaded on the studs 12 to secure the attachment flange 13 to the adapter plate 9. In this manner the spare tire wheel 1 can be mounted on the hub 4 of the trailer 5, and it is not necessary to carry a special spare tire wheel for said trailer.

The projection of the stop shoulders 14 on the studs 12 prevents any engagement, when the parts are assembled, of the attachment flange 13 with the adjacent ends of the studs 6, maintaining proper spacing between the attachment flanges 3 and 13.

For those cases wherein the circumferential row of holes in the automobile wheel is on the same circle as the studs of the attachment flange of the hub of the trailer wheel, but said wheels are different in number, and consequently of different circumferential spacing, the invention is embodied in the adapter plate the same as hereinbefore described except that the circumferential rows of holes and studs on the plate are on the plate in the same circle but with the number and spacing of the holes corresponding to the studs on the attachment flange of the trailer wheel hub, and the number and spacing of the studs corresponding to the holes of the automobile wheel.

From the foregoing description it will be readily seen that there has been provided such a device as substantially fulfills the object of the invention as set forth herein.

While this specification sets forth in detail the present and preferred construction of the device, still in practice such deviations therefrom may be resorted to as do not form a departure from the spirit of the invention, as defined by the appended claim.

Having thus described the invention, the following is claimed as new and useful and upon which Letters Patent are desired:

A wheel adapter comprising a relatively thin flat plate having a central opening to fit over a wheel hub provided with a plurality of circumferentially spaced bolt holes disposed as to permit the plate to be placed over a plurality of circumferentially spaced wheel supporting bolts on the hub flange, a plurality of circumferentially spaced studs permanently fixed to and carried by the plate and projecting from the face thereof concentrically with respect to the circle of the bolt holes, the circle of the holes and that of the studs being of different radii, each projecting stud being formed with a shoulder and its threaded portion projecting beyond said shoulder, the length of the studs between the face of the plate and the shoulder being greater than that portion of the length of the wheel mounting bolts which will project beyond the face of the plate when the latter is mounted upon said bolts.

ELWOOD M. JUERGENSON.

REFERENCES CITED

The following references are of record in the file of this patent:

UNITED STATES PATENTS

| Number | Name | Date |
|---|---|---|
| 1,364,327 | Slaymaker | Jan. 4, 1921 |
| 1,365,896 | Duffy | Jan. 18, 1921 |
| 1,768,947 | Barber | July 1, 1930 |
| 1,856,866 | Feigelson | May 3, 1932 |
| 1,904,081 | Pratt | Apr. 18, 1933 |
| 2,067,620 | Johnston | Jan. 12, 1937 |
| 2,195,590 | Eksergian | Apr. 2, 1940 |

FOREIGN PATENTS

| Number | Country | Date |
|---|---|---|
| 387,117 | Great Britain | Feb. 2, 1933 |